US 6,552,726 B2

(12) United States Patent
Hurley et al.

(10) Patent No.: US 6,552,726 B2
(45) Date of Patent: *Apr. 22, 2003

(54) SYSTEM AND METHOD FOR FAST PHONG SHADING

(75) Inventors: James T. Hurley, Pleasanton, CA (US); Fedor A. Pletenev, Sarov (RU)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,581

(22) Filed: Jul. 17, 1998

(65) Prior Publication Data

US 2001/0048444 A1 Dec. 6, 2001

(51) Int. Cl.[7] .......................... G06T 15/50; G06T 15/60
(52) U.S. Cl. .......................... 345/426; 345/601
(58) Field of Search ................ 345/431, 589, 345/597, 598, 426, 601

(56) References Cited

U.S. PATENT DOCUMENTS

| | | | | |
|---|---|---|---|---|
| 4,709,231 A | * | 11/1987 | Sakaibara et al. | 345/426 |
| 4,901,064 A | * | 2/1990 | Deering | 345/426 |
| 4,928,250 A | * | 5/1990 | Greenberg et al. | 345/426 |
| 5,025,405 A | * | 6/1991 | Swanson | 345/426 |
| 5,067,098 A | * | 11/1991 | Moellering et al. | 345/426 |
| 5,163,126 A | * | 11/1992 | Einkauf et al. | 345/423 |
| 5,253,339 A | * | 10/1993 | Wells et al. | 345/426 |
| 5,369,737 A | * | 11/1994 | Gholizadeh et al. | 345/423 |
| 5,561,746 A | * | 10/1996 | Murata et al. | 345/425 |
| 5,659,671 A | * | 8/1997 | Tannenbaum et al. | 345/426 |
| 5,710,876 A | * | 1/1998 | Peercy et al. | 345/426 |
| 5,777,620 A | * | 7/1998 | Billyard | 345/426 |
| 5,880,736 A | * | 3/1999 | Peercy et al. | 345/426 |
| 5,905,503 A | * | 5/1999 | Penna | 345/426 |
| 5,940,067 A | * | 8/1999 | Greene | 345/422 |
| 5,949,424 A | | 9/1999 | Cabral et al. | |
| 6,064,395 A | * | 5/2000 | Miura | 345/418 |
| 6,175,367 B1 | * | 1/2001 | Parikh et al. | 345/426 |

OTHER PUBLICATIONS

"Design Principles of Hardware–Based Phong Shading and Bump–Mapping" Bennebroek et al., Comput. & Graphics, vol. 21, No. 2, pp. 143–149, 1997.*
"Phong Normal Interpolation Revisited" Van Overveld et al., ACM Transactions on Graphics, vol. 16, No. 4, Oct. 1997, pp. 397–419.*
"Andrew Glassner's Notebook" Andrew Glassner, IEEE Computer Graphics and Applicaitons, Mar. 1997, pp. 83–87.*
"Shading Models for Realistic Image Synthesis" W. Knox Jr., IEEE, 1989, pp. 596–603.*
Chapter 2 Using 3D Studio Max, Mar. 15, 1996, pp. 29, Autodesk, inc., Printed in Canada.

(List continued on next page.)

*Primary Examiner*—Jeffery Brier
*Assistant Examiner*—Ryan Yang
(74) *Attorney, Agent, or Firm*—Blakely, Sokoloff, Taylor & Zafman LLP

(57) ABSTRACT

A method for implementing per-pixel shading is provided that is fast enough to be used with real time interactive graphics products. Computationally expensive color values are precalculated for a sample of normal vector orientations as a function of orientation-dependent color values, collected in a color map, and referenced through the color variables. The color variables are linearly related to angle coordinates that specify the normal vector orientations in a selected coordinate system. Angle coordinates are determined for the vertices of the polygons representing the object to be imaged. During rendering, the vertex angle coordinates are interpolated to provide pixel color angles, which are converted to color variables. Color values referenced by the color variables are assigned to the corresponding pixels.

23 Claims, 9 Drawing Sheets

OTHER PUBLICATIONS

Claussen, Ute, "On Reducing the Phong Shading Method", *Eurographics '89*, Eurographics Association, 1989, pp. 333–344.

Kuijk, A.A.M., et al., "Faster Phong Shading via Angular Interpolation", *Computer Graphics Forum 8*, 1989, pp. 315–324.

Duff, Tom, New York Institute of Technology, "Smoothly Shaded Renderings of Polyhedral Objects on Raster Displays", *ACM*, 1979, pp. 270–275.

Bishop, Gary et al., AT&T Bell Laboratories, "Fast Phong Shading", *ACM*, Nov. 4, 1986, vol. 20, pp. 140–106.

* cited by examiner

Gouraud Shading   Phong Shading   Fedor Shading

Gouraud Shading   Phong Shading   Fedor Shading

Gouraud Shading   Phong Shading   Fedor Shading

Gouraud Shading   Phong Shading   Fedor Shading

SYSTEM AND METHOD FOR FAST PHONG SHADING

BACKGROUND OF THE INVENTION

1. Technical Field

This invention relates to the field of computer graphics, and in particular to methods for implementing shading in computer graphics.

2. Background Art

Computer images having realistic three dimensional appearances ("3D images") are becoming increasingly prevalent in games, multi-media, and other graphics-heavy software. The methods employed to generate 3D images require processing power that has only recently become available in personal computers. A standard method for generating a 3D image begins with sets of polygons that represent the surfaces of each object in the image. An object that has a moderately complex shape may require thousands of polygons to represent its surface, and an image that includes multiple objects may require tens or even hundreds of thousands of polygons. Illumination and orientation data for each of these polygons must be processed and converted to pixel level data to generate a 3D image on a computer monitor. A computer may have to process 50 million pixels (≈0.5 million polygons) per second to generate a 3D image that includes multiple objects of moderate complexity. This places a significant burden on the processing power of the computer.

Image processing is implemented by a 3D pipeline that typically includes a geometry stage and a rendering stage. In the geometry stage, the orientation of each polygon and the location of any light sources that illuminate the polygon are determined with respect to a reference coordinate system and specified by vectors associated with the polygon's vertices. This vertex data is transformed to a coordinate system ("camera coordinate system") that facilitates viewing the image on a computer monitor and rotated to a desired orientation. In the rendering stage, the vertex data for each polygon is converted into the pixel level data necessary to represent the object on the computer monitor. Since there are tens to hundreds of pixels per polygon, rendering significantly slows the image generation process.

The two dimensional (2D) image on the computer monitor obtains its 3D appearance through lighting and perspective effects implemented by the graphics pipeline. The 3D appearance of an object depends significantly on the shading method used to assign color values to the pixels of the polygons. Realistic 3D images require relatively sophisticated shading methods that determine color values on a pixel by pixel basis. Consequently, these shading methods are implemented during the rendering stage of the pipeline.

The principal shading methods are, in order of increasing sophistication, flat shading, Gouraud shading, and Phong shading. Flat shading assigns the same color values to all the pixels in a polygon. Gouraud shading assigns color values to the pixels by interpolating from the color values at the vertices of the polygon. Phong shading assigns color values by interpolating a normal vector for each pixel from the normal vectors at the polygon vertices, and evaluating an illumination equation at each pixel using its interpolated normal vector. Phong shading and its variants are referred to as per-pixel shading methods, since the colors of an image are calculated for each pixel according to its orientation characteristics. These per pixel orientation characteristics are also necessary to implement advanced graphic features, such as bump mapping. Bump mapping modifies lighting features by perturbing the surface normal from its interpolated value and determining color values using the perturbed normal.

Systems that generate fast, interactive graphics typically employ flat and Gouraud shading. These methods employ approximations in the rendering stage that are relatively cheap computationally, and the corresponding images can be generated in real time without elaborate graphics hardware. The images produced by these methods lack the lighting effects that distinguish quality 3D images, such as realistic specular highlights and diffuse light scattering. In addition, these methods are not amenable to bump mapping, since per pixel normal orientations are never determined. High end computer systems may include advanced rendering hardware to implement Phong shading. Even with high quality graphics hardware, the computational cost of Phong shading makes it difficult to generate real-time, interactive 3D images.

There is thus the need for a practical implementation of per-pixel shading methods that are suitable for use in real-time, interactive 3D graphics applications and may be implemented without the need for sophisticated graphics hardware.

SUMMARY OF THE INVENTION

The present invention provides per-pixel shading that is fast enough for real time interactive graphics applications and may be implemented using standard graphics hardware.

In accordance with the present invention, color values are precalculated, collected in a color map, and referenced by orientation-dependent color variables. During rendering, per-pixel vector orientations are mapped to color variables through a pair of angular coordinates, and pixel color values are provided by a corresponding entry in the color map.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, and components have not been described in detail in order to focus attention on the features of the present invention.

Figure 1:
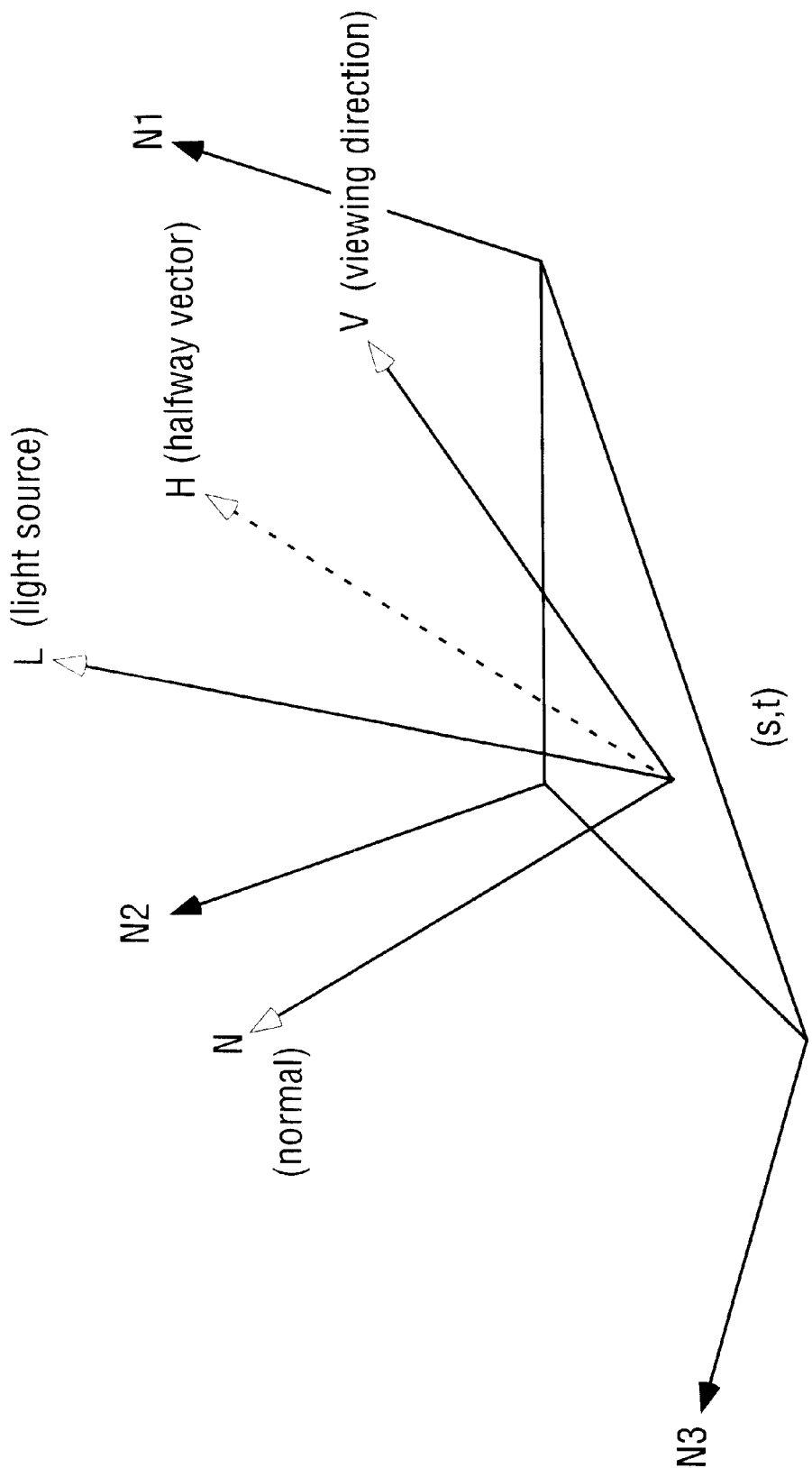
FIG. 1 is shows the different vectors associated with a polygon to determine color values for the pixels of the polygon.

FIG. 1 shows the different vectors that are associated with a polygon P for implementing various illumination models. In the following discussion, vectors and matrices are represented by bold capital letters. P is shown as a triangle for purposes of illustration with the understanding that any type of convex, planar polygon may be used to approximate the surface of an object. Vectors N, L, V, and H are shown for an arbitrary set of surface coordinates (s, t) on P. N is a unit vector that is normal to P at (s, t). L is a unit vector at (s, t) that points toward a light source illuminating P. V is a unit vector at (s, t) that points in the direction from which the object is viewed, e.g. the viewing or camera direction. H is a vector that is halfway between L and V. When normalized, H is given by $(V+L)/|V+L|$. H is convenient for determining the specular component of light at a surface location.

The three vertices of P are characterized by unit normals N1, N2, N3. These normals indicate the orientation of P at each vertex and are specified by a set of Cartesian coordinates $(n_x, n_y, n_z)$. The vertex normals may be generated in the geometry stage of a graphics pipeline or, more typically, provided with a model of the object. Although not shown in FIG. 1, the vertices of P may also be characterized by values of L and V.

In Phong-type per-pixel shading methods, the orientations of vectors N, L, and H are estimated for each pixel from their corresponding vertex values. An illumination model is evaluated at each pixel using the estimated vectors, and the resulting color value is assigned to the pixel for display on the computer monitor.

Equation (I) is representative of the illumination equations used to determine the color value of a pixel at a location (s,t).

$$C(s, t) = \sum_{j=0}^{N-1} \left( \frac{M_a L_{aj} + M_d L_{dj}(N(s, t) \cdot L_j(s, t)) + M_s L_{sj}(N(s, t) \cdot H_j(s, t))^A}{D(s, t, j)} \right). \quad \text{Eq. (1)}$$

Here, $M_d$, $M_s$, and $M_a$ are characteristics of the object material for diffuse, specular, and ambient light, respectively, and $L_{dj}$, $L_{sj}$ and $L_{aj}$ are the diffuse, specular, and ambient components of light source, $L_j$ respectively. $D(s,t,j)$ is the distance between light source $L_j$ and the pixel at s,t, and A is the specular exponent of the material.

Using Eq. (1) to generate a 3D image requires the repetition of a number of costly operations for each pixel of the image. Ignoring various approximations, N, L, and H are estimated for each pixel from their corresponding vertex values. Eq. (1) is then evaluated for each pixel, using the estimated vectors. This entails evaluation of dot products (N·L and N·H), one of which is raised to a power (A). In addition, interpolation does not preserve the unit length of the normal, so that square root and division operations must be implemented for each pixel normal.

The computational overhead of Eq. (1) is thus large, and when implemented in the rendering stage of the graphics pipeline, makes real time interactive graphics impractical. This overhead can be reduced through various approximations. For example, cosine, square root, and inverse functions can be evaluated using look-up tables, which sacrifice accuracy for speed. The orientations of L and/or H can be treated as constant across the polygon, when the separation between the object and the light source or the viewer (camera) is relatively large. The object can be illuminated and viewed from the same direction, so that L and V (and thus L and H) are parallel, and N·L=N·H. This is a relatively common geometry in video games. Even with these strategies, Eq. (1) is still evaluated real time for each pixel, significantly slowing down the rendering process. The loss of accuracy can also produce noticeable defects in the resulting images.

The present invention provides per-pixel shading that is suitable for generating 3D images in real-time, interactive applications, using commonly available graphics hardware. This is accomplished by representing vector orientations through a pair of polar angle coordinates to simplify interpolation, scaling the angle coordinates to provide texture-like processing, and precalculating color values for a sample of normal vector orientations. The color values are parameterized by one or more angle-dependent color variables, collected in a color map, and referenced by their corresponding color variables. The color map needs to be recalculated only when the geometry with which the object is lit or viewed changes.

During rendering, angle coordinates of a vector, e.g. N, L, H, are determined for each pixel by interpolation from the values at the polygon vertices. Interpolation of the angle coordinates eliminates the need to renormalize the vector at each pixel. The angular coordinates are converted to color variables, which map the vector orientations to a two dimensional array. The color variables reference illumination data in the color map that is appropriate for the relative light, camera, and normal vector orientations at the pixels. Thus, color values may be provided during the rendering stage using a relatively fast look-up procedure. This approach may be used to shade objects for any number of light sources, and it may be used whether the light source(s) are near the object (local) or "infinitely" distant from the object (non-local). It may also be used whether the camera is local or non-local.

Figure 2:
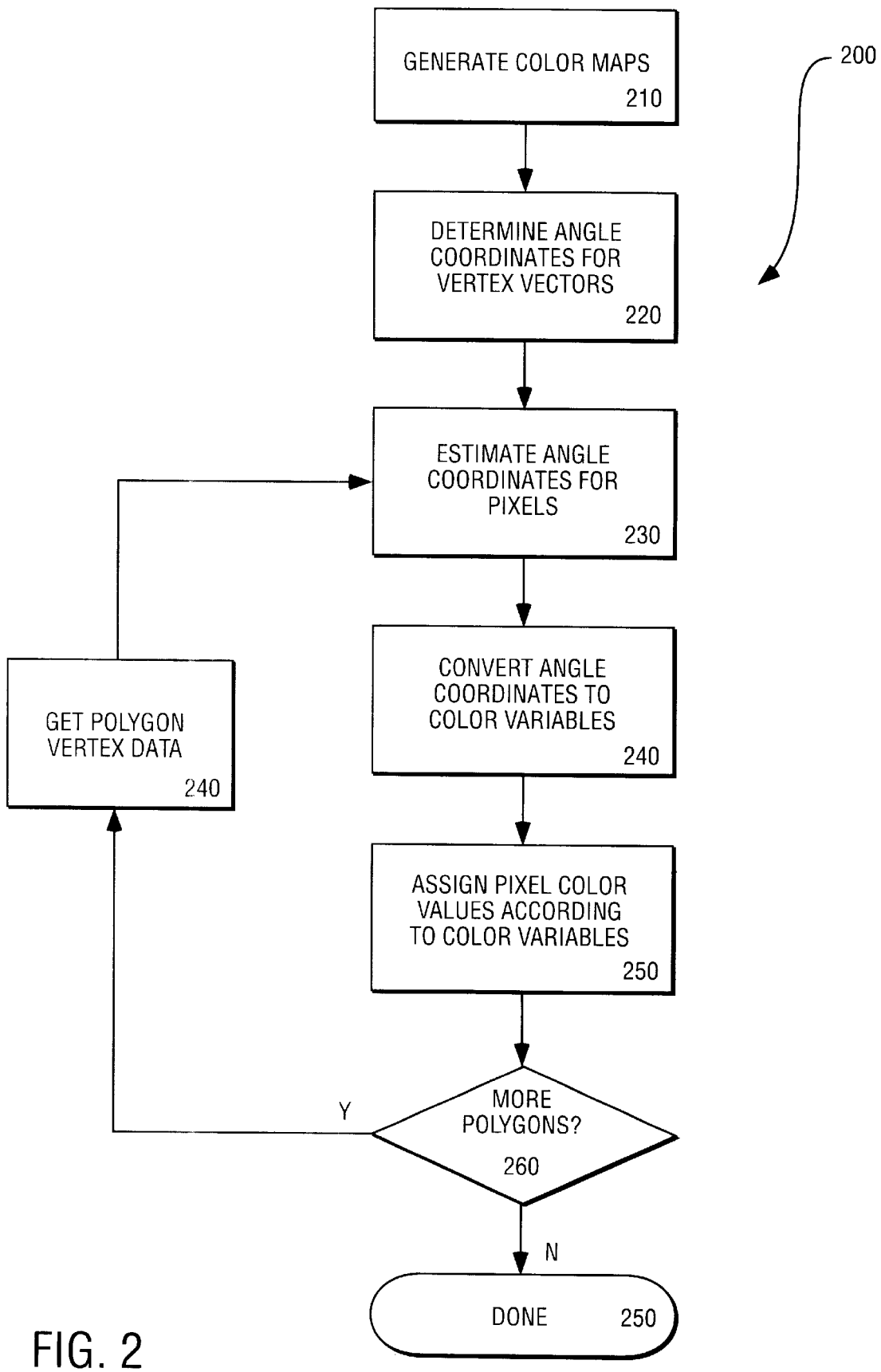
FIG. 2 is a flowchart representing an overview of a per-pixel shading method in accordance with the present invention.

FIG. 2 provides an overview of a method in accordance with the present invention for implementing per-pixel shading. At step 210, one or more color maps are generated, according to the properties of the object and the one or more light sources that illuminate it. Angle coordinates are then generated 220 for L, H, and N at the vertices of a polygon. Steps 210 and 220 are typically implemented prior to rendering. During rendering, angle coordinates are estimated 230 for the pixels of the polygon and converted 240 to color variables. A color value is assigned 250 to the pixel from the one or more color maps according to its color variable(s). If more polygons remain to be processed 260, vertex data for the next polygon is retrieved 270 and steps 230–260 are repeated. If no more polygons remain 260, processing for the object is done 270.

A detailed embodiment of the present invention is discussed first for the case in which the light source is non-local and the object is illuminated and viewed from the same direction (L and V are parallel). The modifications are then discussed for cases where V and L are not parallel and where multiple light sources are present. Finally, the modifications for the case of local light sources and cameras are discussed.

One feature of the present invention is the use of a two variable, polar coordinate system (angle coordinates) to represent vector orientations, instead of the conventional three variable, cartesian coordinate system. As noted above, the angle coordinates can be interpolated without altering the normalization of the corresponding vector, and they provide uniform coverage of vector orientations using linear interpolation methods. They also simplify specification of relative vector orientations. The angle coordinates are linearly related to orthogonal color variables that range between 0 and 1. The color variables reference color values in a precalculated color map in much the same way that texture variables reference texture values in a texture map.

For one embodiment of the invention, the angle coordinates of a normal vector are mapped to a two dimensional (2D) grid of color variables, and color values are assigned to pixels from a color map that is referenced to the same color variable grid. The color map for this embodiment may contain light contributions from one or more light sources. For non-local light sources, angle coordinates specifying the relative orientation of the normal and light vectors are mapped to a one dimensional table of color variables, and color values are assigned to pixels from a one dimensional color map that is referenced to the same color variable table. The one dimensional color map represents light contributions from a single light source. One dimensional color maps for multiple light sources may be combined to form a 2D color map in which color values are referenced through a color variable and a light source identifier. In each case, the color mapping may be implemented using modified texture mapping techniques and hardware.

Figure 3:
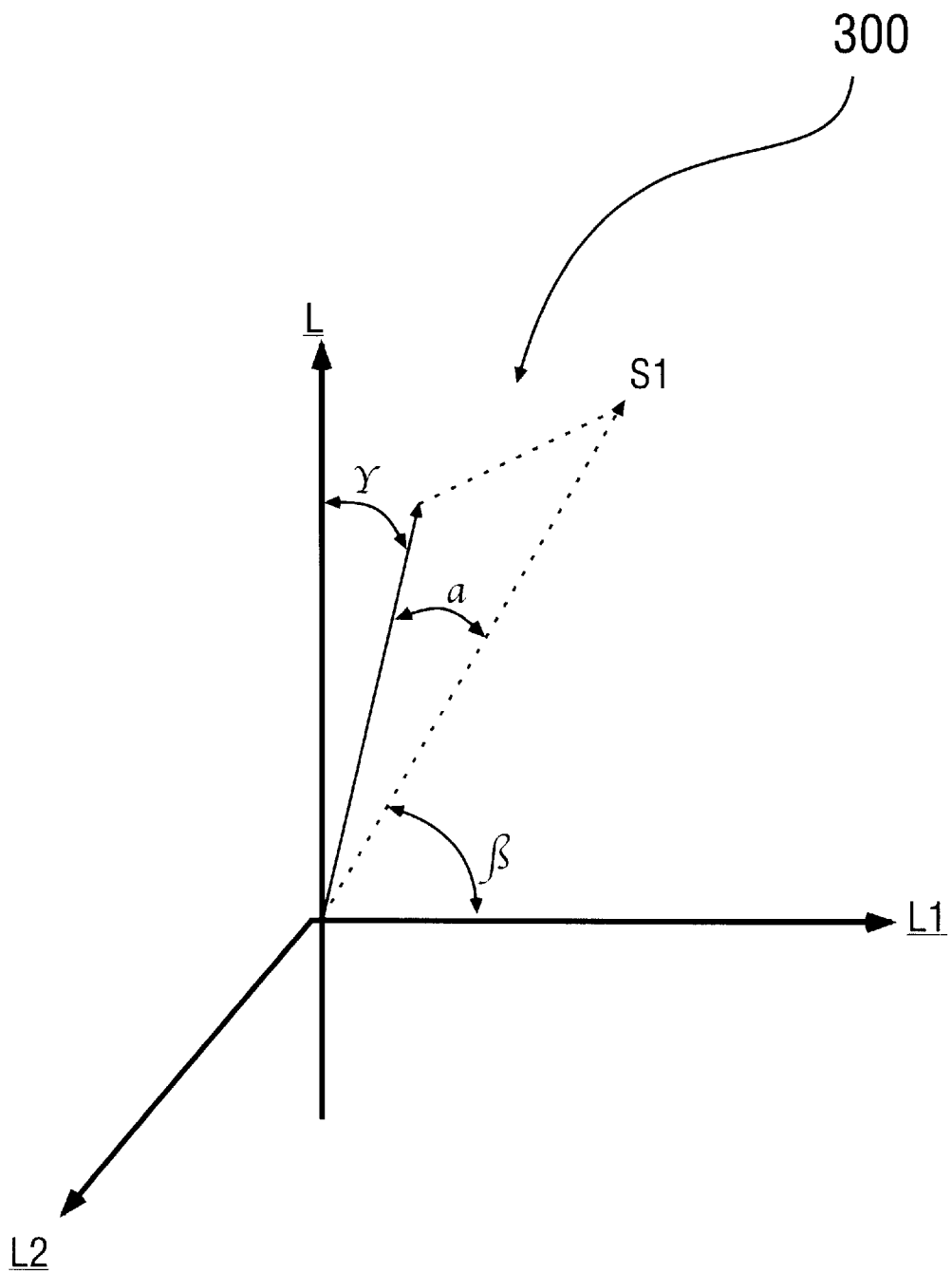
FIG. 3 shows the angle coordinates used to represent the orientation of a vector in accordance with the present invention.

FIG. 3 illustrates angle coordinates suitable for representing the orientation of a vector, e.g. vertex normal N, in accordance with one embodiment of the present invention. In this coordinate system, L is a unit vector that is directed towards a light source. L, L1, and L2 form the basis vectors for a cartesian coordinate system 300 in which a normal N is specified. S1 is a vector representing the projection of N onto a plane formed by the L and L1 basis vectors ("L-L1 plane"). A first angular variable, $\alpha$, is defined as the angle between N and S1. A second angular variable, $\beta$, is defined as the angle between S1 and L1. In the disclosed coordinate system, $\alpha$ ranges from 0 to $\pi/2$ and $\beta$ to range from 0 to $\pi$.

For one embodiment, color variables $u_c$ and $v_c$ are related to $\alpha$ and $\beta$ through the following relationships:

$$u_c = \begin{cases} .5 - \alpha/\pi & \text{if } (N \cdot L_2) \geq 0 \\ .5 + \alpha/\pi & \text{if } (N \cdot L_2) < 0 \end{cases} \qquad \text{Eq. 2a}$$

$$v_c = \begin{cases} \beta/\pi & \text{if } (N \cdot L) \geq 0 \\ 1 - \beta/\pi & \text{if } (N \cdot L) < 0 \end{cases} \qquad \text{Eq. 2b}$$

A color map for this case (L=V, light source at infinity) may be precalculated in terms of the color variables as follows:

$$C(u_c, v_c) = M_d L_a + M_d L_d \Omega_L(u_c, v_c) + M_s L_s \Omega_H(u_c, v_c)^A \qquad \text{Eq. 3}$$

Here, $\Omega_L(u_c, v_c)$ and $\Omega_H(u_c, v_c)$ are functions of color variables, $u_c$ and $v_c$, representing a range of normal orientations. For the above example, where L and H are parallel, $\Omega_L(u_c, v_c)$ and $\Omega_H(u_c, v_c)$ are equal and are the orientation-dependent portion of Eq. 3 becomes $(M_d L_d + M_s L_s)\Omega(u_c, v_c)$, where $\Omega(u_c, v_c)$ is given by:

$$\Omega(u_c, v_c) = \cos[\pi(0.5 + u_c)]\sin[2\pi v_c] = \sin[\pi u_c]\sin[2\pi v_c]. \qquad \text{Eq. 4}$$

Figure 4:
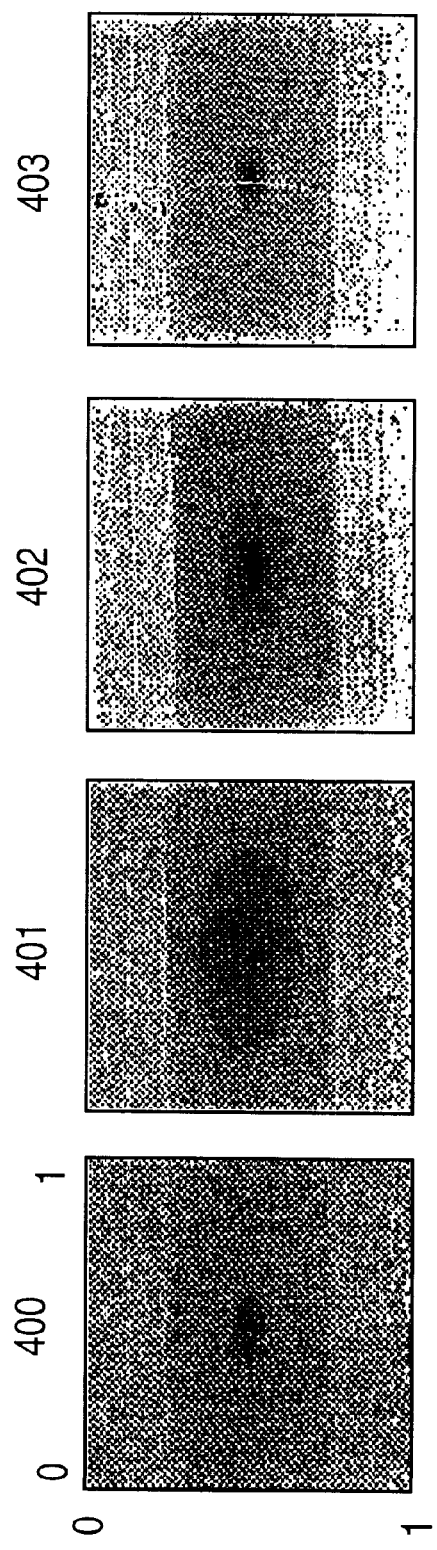
FIG. 4 is a color map comprising color values that are referenced through corresponding color variables.

Here, the subscript has been dropped from $\Omega$. FIG. 4 shows color maps 400, 401, 402, 403 calculated using Eq. 4 with different values of the specular exponent A. In accordance with the present invention, color maps 400–403 are precalculated and referenced through color variables $u_c$ and $v_c$.

In order to assign color values from, e.g., color map 400 to the pixels representing the illuminated object, color variables are determined for each pixel of the component polygons. The starting point for determining pixel color variables for a given polygon is the angle coordinates $\alpha$, $\beta$ of the polygon's vertex normals. Vertex values of the angle coordinates may be determined using standard transformation techniques, as discussed below in greater detail. During rendering, angle coordinates $\alpha$, $\beta$ are generated for each pixel from the corresponding vertex normal values. The angle coordinates $\alpha$, $\beta$ for each pixel are then converted to color variables $u_c$, $v_c$, and a corresponding color value is provided from color map 400.

Illumination data related to other vectors quantities may be readily accommodated in color map 400. For example, when V and L are not parallel, the orientation function, $\Omega_H(u_c, v_c)$ differs from $\Omega_L(u_c, v_c)$ and must be determined independently. The orientation of H in the coordinate system of FIG. 3 may be specified by angular coordinates, $\alpha_H$, $\beta_H$ (or corresponding color variables $u_{cH}$, $v_{cH}$), and the corresponding orientation function is given by:

$$\Omega_H(u_c, v_c) = \sin[\pi(u_c - u_{cH})]\sin[2\pi(v_c - v_{cH})]. \qquad \text{Eq. 5}$$

Since $u_{cH}$ and $v_{cH}$ are constants for a given illumination/viewing geometry, the sum of $M_s L_s \Omega_H(u_c, v_c)$ and $M_d L_d \Omega_L(u_c, v_c)$ may be referenced through the same color variables to form a color map for the case where L and H are not parallel.

Similarly, where multiple light sources are present, the orientation of each additional light source, $L_i$, may be specified through angle coordinates, $\alpha_{Li}$, $\beta_{Li}$ (or their corresponding color variables, $u_{cLi}$, $v_{cLi}$). Diffuse terms for each additional light source may then be incorporated into color map 400 through a corresponding orientation function, $\Omega_{Li}(u_c, v_c)$, in which $u_c$, $v_c$, are offset by constant color variables, $u_{cLi}$, $v_{cLi}$ as in Eq. 5. Specular terms for each additional light source $\Omega_{Hi}(u_c, v_c)$ may be similarly incorporated for each $L_i$ that is not parallel to H.

One shortcoming of the coordinate system of FIG. 3 is that close normals may not correspond to close color texture coordinates. For example, if the viewing direction (V) corresponds to color variables near the edge of color map (FIG. 3), small changes in the viewing direction of the object may result in large changes in the color variables for normals on opposite sides of the origin (e.g. $\beta=0$). This can create a discontinuous appearance in those regions of the object that correspond to extreme color variables of the color map.

One method for addressing these discontinuities is to employ a coordinate system in which the defects, e.g. discontinuities, are on polygons on the side of the object opposite to that being viewed, independent of the location of the light source(s). This may be accomplished, for example, in a coordinate system in which the normal angles are defined relative to the camera (viewer) direction rather than light source direction. In FIG. 3, this means that L is replaced by V, and the angle coordinates $\alpha$, $\beta$ refer to the direction of a normal or a light source, $L_i$, with respect to V.

As in the discussion of color map 400, a color map in the camera-fixed coordinate system is generated by sampling a range of normal orientations specified by, e.g., angle coordinates, $\alpha$, $\beta$. The set of sampled normals defines a unit sphere. The hemisphere visible to the viewer is mapped to a planar grid as follows:

$$u_c = \alpha/\pi \qquad \text{Eq. 5}$$

$$v_c = \beta/\pi \qquad \text{Eq. 6}$$

For one embodiment, the 2D color map or table includes diffuse lighting contributions from all light sources as a function of normal orientations specified by $u_c$, $v_c$. For specular lighting purposes, it is assumed that the central element of the 2D table (½, ½) represents a normal pointing directly into the camera. Thus, H can be established and specular contributions can be determined and added for all lights.

During rendering, the orientation of a pixel normal is interpolated from vertex values of $\alpha$, $\beta$, and converted to color variables $u_c$, $v_c$. The pixel color value is provided by the entry in the 2D table referenced by $u_c$, $v_c$. It is noted that since each pixel is treated independently, there are likely to be parallax errors, and pixels in shadow may be lit as if they were not in shadow.

A color map for multiple, non-local lights illuminating a polygon characterized by one set of material properties in the viewer-referenced coordinate system is calculated as follows:

$$C^1[u_c, v_c] = \qquad \text{Eq. 7a}$$
$$\sum_{j=0}^{N-1} (M_{aj}L_{aj} + M_{dj}L_{dj}(N_x[u_c, v_c] \cdot L_j) + M_{sj}L_{sj}(N_x[u_c, v_c] \cdot H_j)^A)$$

$$C^2[u_c, v_c] = \qquad \text{Eq. 7b}$$
$$\sum_{j=0}^{N-1} (M_{aj}L_{aj} + M_{dj}L_{dj}(N_y[u_c, v_c] \cdot L_j) + M_{sj}L_{sj}(N_y[u_c, v_c] \cdot H_j)^A)$$

Here, $L_j$ and $H_j$ are the light source and halfway vectors for light source (j) in the viewer-referenced coordinate system. For one embodiment of the present invention, $N_x[u_c,v_c]$ and $N_y[u_c,v_c]$ are a set of vectors that sample a range of orientations with respect V. $N_x[u_c,v_c]$ and $N_y[u_c,v_c]$ are given by the following equations:

$$N_x[u_c, v_c] = \begin{pmatrix} x_u \\ y_v \\ \sqrt{1 - x_u^2 - y_v^2} \end{pmatrix} \text{ if } (x_u^2 + y_v^2) < 1 \qquad \text{Eq. 8a}$$

$$N_x[u_c, v_c] = \begin{pmatrix} x_u \\ \sqrt{x_u^2 + y_v^2} \\ \frac{y_v}{\sqrt{x_u^2 + y_v^2}} \\ 0 \end{pmatrix} \text{ otherwise} \qquad \text{Eq. 8b}$$

$$N_y[u_c v_c] = \begin{pmatrix} x_u \\ -y_v \\ \sqrt{1 - x_u^2 - y_{vi}^2} \\ 0 \end{pmatrix} \text{ if } (x_u^2 + y_v^2) < 1 \qquad \text{Eq. 9a}$$

$$N_y[u_c v_c] = \begin{pmatrix} x_u \\ \sqrt{x_u^2 + y_v^2} \\ \frac{y_v}{\sqrt{x_u^2 + y_v^2}} \\ 0 \end{pmatrix} \text{ otherwise} \qquad \text{Eq. 9b}$$

In this embodiment, the color variables, $u_c$, $v_c$ are related to $x_u$, $y_v$ as follows:

$$x_u = 2u_c - 1 \qquad \text{Eq. 10a}$$

$$y_v = 2v_c - 1 \qquad \text{Eq. 10b}$$

The color map consists of the set of color values $C^1[u_c,v_c]$ and $C^2[u_c,v_c]$ for color variables $u_c$, $v_c$ between 0 and 1. The geometry intensive calculations of Eqs. 7a and 7b, are precalculated, e.g. prior to rendering, for each object that has the same lighting, camera, and material characteristics.

FIGS. 5A and 5B are color maps, $C^1$ and $C^2$, respectively, for the following material and light source characteristics for red, green, and blue (RGB) wavelengths:

$M_a$=(0.15, 0.03, 0.12)
$M_d$=(0.7, 0.12, 0.40)
$M_s$=(1.0, 1.0, 1.0)
$A_{mat}$=40
$L_a(0)=L_d(0)=L_s(0)$=(1, 1, 1) (white light)
$L_a(1)=L_d(1)=L_s(1)$=(0, 0, 1) (blue light)

$M_a$, $M_d$, and $M_s$ are material RGB color vectors for ambient, diffuse, and specular light, $A_{mat}$ is the specular exponent of the material, and $L_a(j)$, $L_d(j)$, and $L_s(j)$ are RGB color vectors for light source (j).

FIGS. 5C and 5D are color tables $C^1$ and $C^2$ for the following material and light source RGB characteristics:

$M_a$=(0.12, 0.09, 0.03)
$M_d$=(0.4, 0.37, 0.06)
$M_s$=(1.0, 0.80, 0.30)
$A_{mat}$=40
$L_a(0)=L_d(0)=L_s(0)$=(1, 1, 1) (white light)
$L_a(1)=L_d(1)=L_s(1)$=(0, 0, 1) (blue light).
$L_a(2)=L_d(2)=L_s(2)$=(0, 1, 0) (green light)
$L_0$=(1, 1, −1), $L_1$=(−1, −1, −1), $L_2$=(1, −1, −1).

Once the color map is calculated for given light source(s) and viewing geometry, angle coordinates are generated for the vertex vectors (N, L, H) of each polygon in the viewer-fixed coordinate system. Angle coordinates for pixel normals are then generated by interpolation from the vertex values and converted to corresponding color variables. Color values for the pixels may then be read from the color map through a relatively fast look-up operation.

For one embodiment of the present invention, vertex values of the angular coordinates in the viewer-fixed coordinate system are generated as follows. Let $M=\{M_{mn}\}$ represent a model view matrix for the object that is being imaged, and $n_{xi}$, $n_{yi}$, $n_{zi}$ represent the x, y, and z components of the normal vector of the $i^{th}$ vertex of a polygon ($n_i$). The model view matrix is the matrix that transforms the coordinates of points in the object from an object-fixed coordinate system (model coordinate system) to a camera-fixed coordinate system (view coordinate system). In the latter coordinate system, V is parallel to the z axis, and the x and y axes are in the plane of the computer monitor. In this embodiment, a normalized vertex normal m in the camera-fixed coordinate system is given by:

$$m = \frac{M \cdot n}{\|M \cdot n\|} \qquad \text{Eq. (11)}$$

The color variables of the $i^{th}$ vertex normal in this coordinate system are:

$$u_{ci}=m_{xi}, v_{ci}=m_{yi}, w_{ci}=m_{zi} \qquad \text{Eq. (12)}$$

The color variables for the polygon pixels may be generated from $\{m_{xi}, m_{yi}, m_{zi}\}$ using standard interpolation methods. These methods are described, for example, in Foley, van Dam, Feiner, and Hughes, *Computer Graphics Principles and Practice*, Addison Wesley, Reading Mass. (1996).

In the disclosed embodiment of the invention, the color value for a pixel is provided from color map $C^1$ or $C^2$, depending on the interpolated value of $m_z$. A color value is assigned to the pixel from $C^1$ when $m_z \geq 0$ and a color value is assigned to the pixel from color table $C^2$ when $m_z < 0$. $C^2$ is included in the discussion for completeness, since pixels that are mapped to color map $C^2$ are not visible when the object is transformed to the camera coordinate system described above.

FIGS. 6A–6E show a series of images generated using the method of the present invention. For comparison, the same images generated using Gouraud shading and Phong shading are shown adjacent to them. The method of the present invention allows the figures to be generated in approximately the same amount of time as required for the Gouraud shaded object, and in much shorter times than required for the Phong object. The images in FIGS. 6A–6E generated by the present invention have highlights that are superior to those of the corresponding Gouraud shaded images and comparable to those achieved using the far more expensive Phong shading technique.

Figure 5:
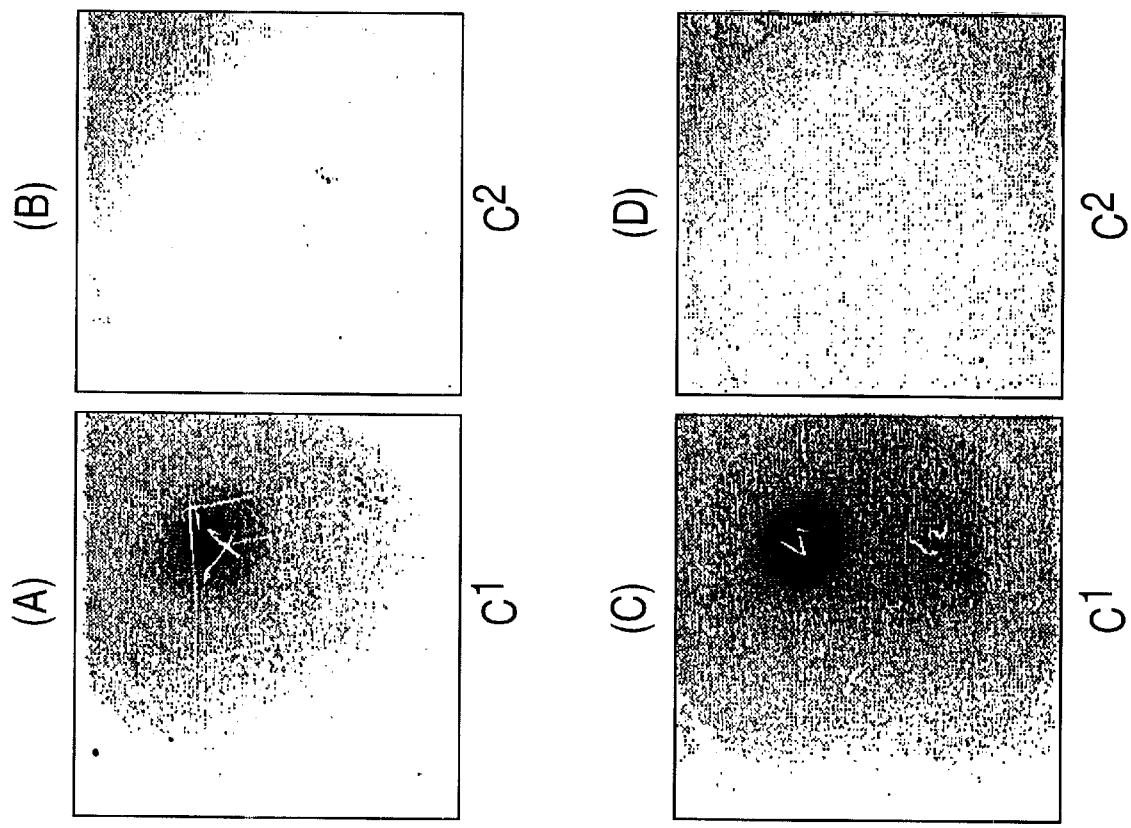
FIGS. 5A–5D are examples of color maps generated using the method of the present invention.
Figure 6A:
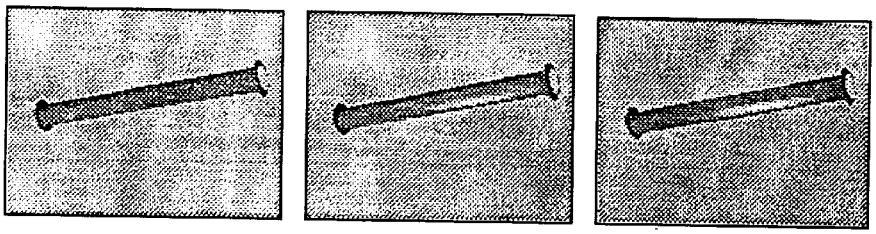
FIGS. 6A–6E are images generated using the method of the present invention.
Figure 6B:
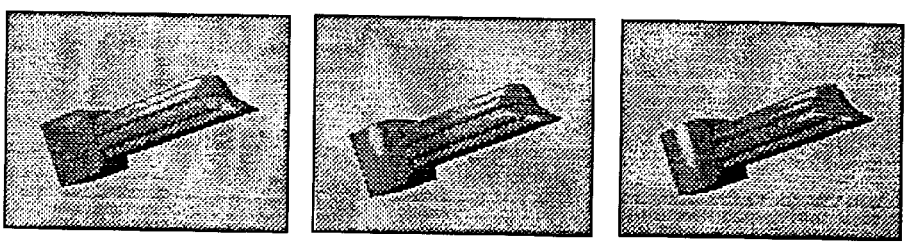
Figure 6C:
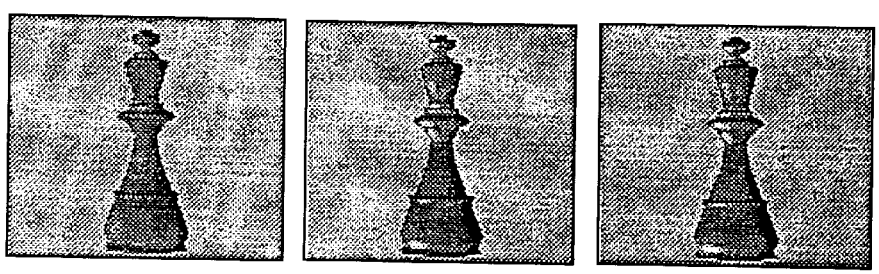
Figure 6D:
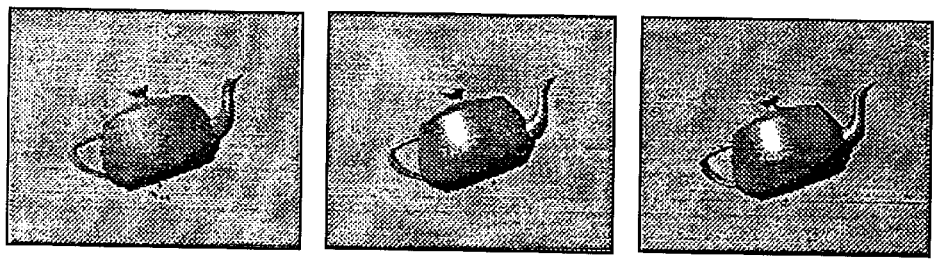
Figure 6E:
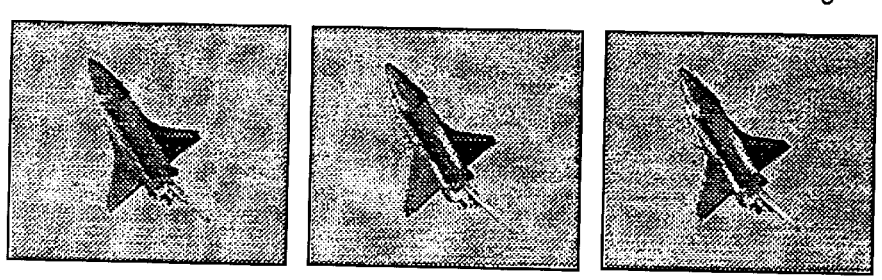

Local lights are not readily treated with the color maps described above, since the orientation of the light source vector varies with pixel position in the polygon. Color maps in which only normal vector orientations are sampled, e.g. FIGS. 4 and 5, are inadequate when the light vector varies as well. Color maps that sample both normal and light vector orientations are expensive to calculate and require four color variables to reference one color value. Since the color value depends only on the relative orientation of N and L (when L and V are parallel), the computational cost of the four parameter color map unnecessary. The use of four color variables also eliminates the parallels with texture mapping provided by the present invention.

For one embodiment of the present invention, local lights are treated using a one dimensional color map for each local light source. Returning to FIG. 4, it is evident from the symmetry of color map 400 that a significant amount of redundant information is present. This follows from the fact that the only angle of significance in Eq. (4) when L and V are parallel is the angle y between L and N (FIG. 3). For example, Eq. 4 for $\Omega(u_c, v_c)$ is equivalent to:

$$\text{Cos } \gamma = \text{Cos } \alpha \cdot \text{Sin } \beta. \qquad \text{Eq. 13}$$

A corresponding 1D color map may be generated from Eq. 8, with $\Omega(u_c, v_c) = \text{Cos } \gamma$.

Color values can not be determined unambiguously by interpolating γ because vector orientations require two angles to be fully specified. However, angle coordinates α and β can be interpolated for each vector of interest, and γ (or some function of γ) can be generated using Eq 12. Color values may be accessed from the one dimensional color map through γ or a corresponding color variable. For multiple local light sources, a one dimensional color map may be generated for each light source/material combination, with color values referenced by a corresponding color variable. The set of one dimensional color maps may be combined into a single two dimensional color map, with color values indexed by a color variable and light source ID. Since the composite color map is 2 dimensional, it is readily accommodated into the color (texture) mapping framework of the present invention.

Figure 7:
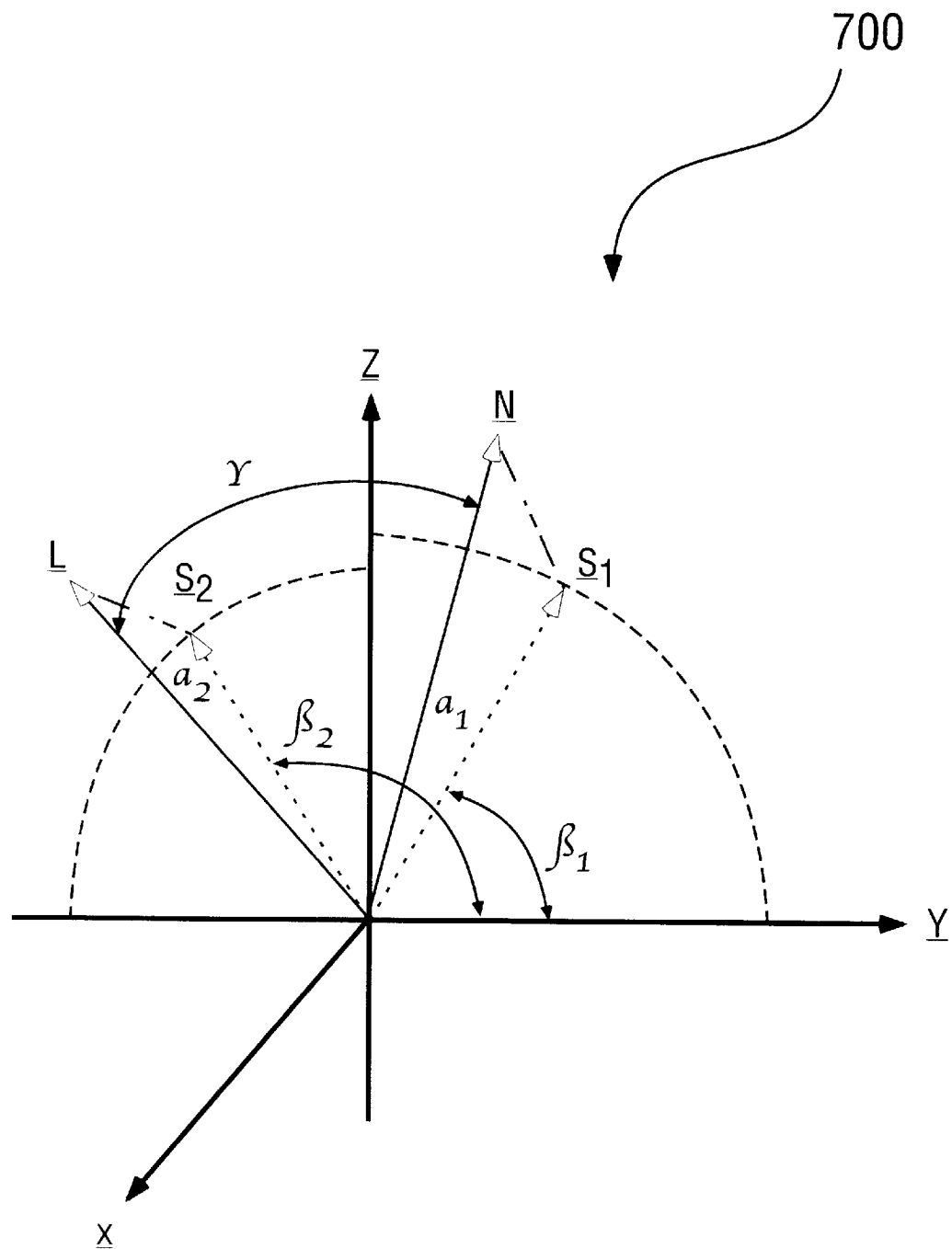
FIG. 7 is a coordinates system suitable for specifying light and halfway vectors when the light source is local to a polygon surface.

FIG. 7 shows a reference coordinate system defining angle coordinates $\alpha_1$, $\beta_1$ and $\alpha_2$, $\beta_2$ specifying the orientations of N and L, respectively, across a polygon. A similar approach applies to determining the relative orientation of N and V for the specular component of Eq. (1). In the disclosed coordinate system, Z is one of the basis vectors and Y is an axis that is perpendicular to Z. $S_1$ represents the vector formed by projecting N onto the Z, Y plane and $\alpha_1$ is the angle between N and the Z, Y plane. $S_1$ also makes an angle $\beta_1$ with the Y coordinate axis in the Z, Y plane. Similarly, $S_2$ represents the vector formed by projecting L onto the Z, Y plane, $\alpha_2$ is the angle between L and the Z, Y plane, and $\beta_2$ is the angle between $S_2$ and the Y coordinate axis in the Z, Y plane.

Using the reference coordinate system of FIG. 7, and the angle pairs $\alpha_1$, $\beta_1$ and $\alpha_2$, $\beta_2$, the vertex orientation of N and L may be specified unambiguously and interpolated to generate angle pairs $\alpha_1(s,t)$, $\beta_1(s,t)$ and $\alpha_2(s,t)$, $\beta_2(s,t)$, respectively, for pixels at locations (s, t). At each pixel location (s,t), angle pairs $\Delta\alpha(s,t)(=\alpha_1(s,t)-\alpha_2(s,t))$ and $\Delta\beta(s,t)(=\beta_1(s,t)-\beta_2(s,t))$ are determined. Since $\Delta\alpha(s,t)$ and $\Delta\beta(s,t)$ are perpendicular to each other, Cos γ is given by Cos $\Delta\alpha$ Sin $\Delta\beta$, per Eq. 12.

Where both local and non-local light sources are present, a single color map may be determined for all non-local light sources in the manner described above, and a separate color map may be provided for each local light source. In each case, the color maps are precalculated for a sample of color variables and referenced according to the color variables. Color contributions for each pixel are then determined by interpolating the angle coordinates for each pixel in a polygon from the vertex values, determining corresponding color variables, and assigning the referenced color values from the appropriate color map.

The parallels between the present invention and texture mapping allows per-pixel shading to be implemented using standard, textures mapping hardware without perspective correction. In the present invention, the color map corresponds to the texture map that is being mapped to a polygon surface, and orientation parameters $u_c$, $v_c$ that reference color values in the color map correspond to the texture coordinates $u_T$, $v_T$ that reference texture values in the texture map. Where the graphics system supports more than one pipeline, per-pixel shading in accordance with the present invention can be carried out in parallel with texture mapping.

Figure 8:
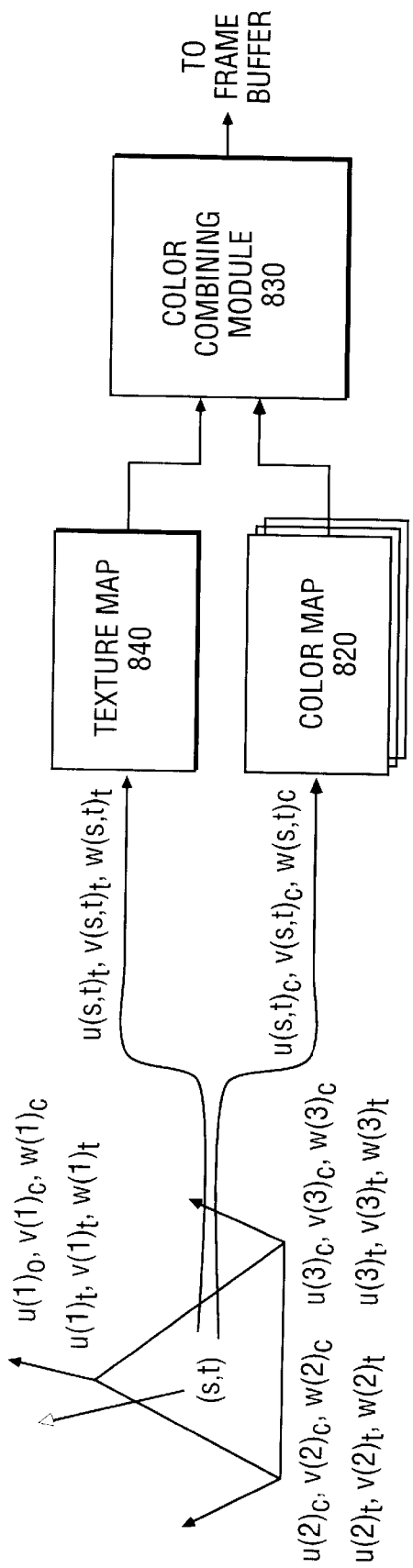
FIG. 8 is a block diagram of a system for implementing the per-pixel shading method of the present invention.

FIG. 8 is a block diagram indicating how the per-pixel shading method of the present invention may be implemented using texture mapping hardware available in most graphics systems. For purposes of illustration, each polygon vertex has associated color variables, $u_c$, $v_c$ $w_c$, corresponding to the angle coordinates of vertex vectors N, L, and H, as required by the particular illumination model, geometry, and simplifying assumptions. These parameters may be determined in the geometry stage of the graphics pipeline or, in the case of the normal vectors, specified in a model. Each polygon vertex is also shown having associated texture variables $u_t$, $v_t$, and $w_t$ for the case where texture mapping is implemented.

Color variables $u(s,t)_c$, $v(s,t)_c$ $w(s,t)_c$, are generated for each pixel location from the vertex values using the interpolation methods discussed above or their equivalents. The interpolated orientation parameters of a pixel are then used to access a color value stored in color map 820. The color value is provided to a color combining module 830 for further processing. Depending on the mix of local and non-local light sources, color values may be provided from different color maps 820.

Similarly, texture variables $u(s,t)_t$, $v(s,t)_t$, and $w(s,t)_t$, at pixel location s, t are generated from the vertex texture values, using standard interpolation methods. The interpolated texture values are then used to access texture data from texture map 840. The accessed texture map values are then provided to color combining module 830. Color combining module 830 receives per-pixel shading and texture data from color map(s) 820 and texture map 840 and combines the received shading and texture data into a suitable shading value for the pixel.

The per-pixel shading method of the present invention may also serve as the basis for an efficient approach to bump mapping. This approach to bump mapping employs a perturbation source, such as a mathematical function, an algorithm, or a bump map, to alter the angle coordinates (or color variables) of pixel normals before referring to the color map(s). For one embodiment of the invention, the perturbation source generates orientation perturbations, $\Delta\alpha$, $\Delta\beta$, that may be combined with the angle coordinates of a pixel to generate "perturbed angle coordinates". The perturbed angle coordinates are converted to color variables, which reference color values representing the perturbed normal orientation.

Figure 9:
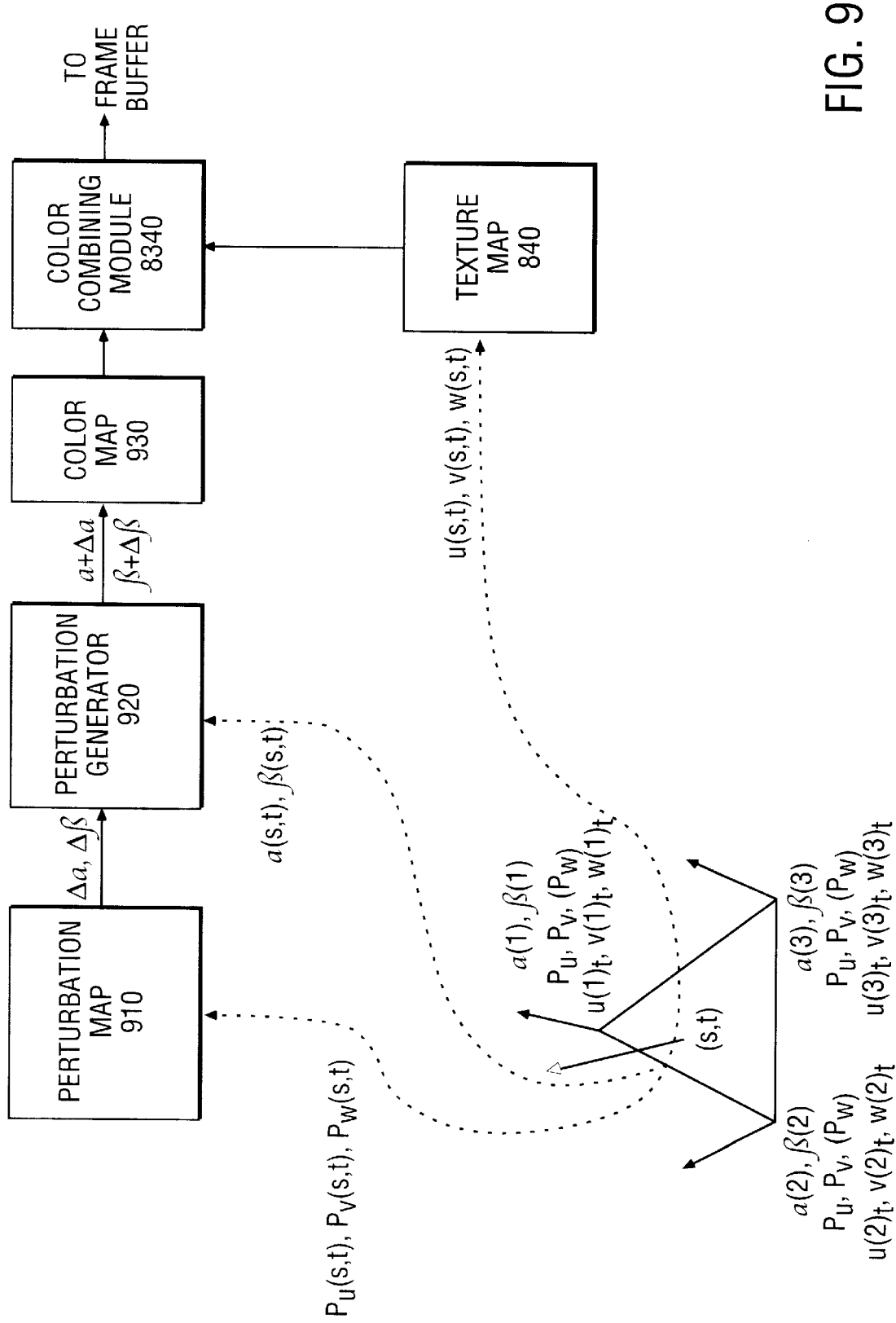
FIG. 9 is a block diagram of the system of FIG. 8 modified to implement a bump mapping method in accordance with the present invention.

FIG. 9 is a block diagram of a system 900 for implementing bump mapping in accordance with the present invention for the case in which the perturbation source is a bump map. System 900 includes a bump map 910, a perturbation generator 920, a color map 930, and a color combining module 940. Also shown is an optional texture map 950. Color map 930 and color combining module 940 are substantially as shown and described in conjunction with FIG. 8. Bump map 910 is a precalculated set of orientation perturbation values ($\Delta\alpha$, $\Delta\beta$) that are referenced through bump coordinates, $P_u$, $P_v$, $P_w$. $P_w$ is shown in parenthesis since it is used only when perspective correction is to be included.

Pixel values of the bump coordinates are interpolated from vertex values of the bump coordinates during rendering. A bump value ($\Delta\alpha$, $\Delta\beta$) referenced by the interpolated bump coordinates is provided from bump map 910 for combination with the angle coordinates of the pixel. The perturbed angle coordinates are converted to color variables and the corresponding color values are provided by the color map.

In the embodiment of FIG. 9, perturbation generator 920 combines bump values ($\Delta\alpha$, $\Delta\beta$) with angle coordinates ($\alpha$, $\beta$) for a pixel to generate perturbed angle coordinates ($\alpha'=\alpha+\Delta\alpha$, $\beta'=\beta+\Delta\beta$). The perturbed angle coordinates are converted to color variables, which are then used to look up a color value in color map 930. The resulting color value is suitable to the perturbed orientation of the pixel's normal vector. As shown in FIG. 9, texture values may also be provided for a pixel from texture map 950 and combined with the color values from color map 930 by color combining module 940.

As noted above, sources other than a bump map may be used to provide the perturbations of the pixel normals. For example, one algorithm for generating perturbations computes the gradient of the color values for an image and converts the gradient to a bump value. Bump values may be generated and added to angle coordinates on the fly or they may be stored to a bump map and combined with angle coordinates on a subsequent pass through the image.

There has thus been provided a per pixel shading system that is suitable for use in real time interactive graphics systems. Color values are precalculated for a sample of normal vector orientations specified by pairs of polar angle coordinates. The color values are collected in a color map and referenced by angle coordinates that have been scaled to a range of between 0 and 1 (scaled angle coordinates or color variables). Values of the angle coordinates are determined for the vertices of each polygon used to model the object to be shaded. During rendering, pixel angle coordinates are determined by interpolating angle coordinates from the vertex values. The pixel angle coordinates are converted to color variables, and a color value referenced by the color variables is assigned to the pixel.

The method may be readily implemented using standard texture mapping hardware. In addition, bump mapping may be implemented by generating per pixel normal perturbations and adding these to the pixel angle coordinates prior to determining a color value.

We claim:

1. A method for implementing per-pixel shading, comprising:

in a geometry stage of a graphics pipeline, generating a table of color values referenced by orientation-dependent color variables;

in a rendering stage of the graphics pipeline estimating first and second angle coordinates to determine a normal direction for each pixel in a polygon;

converting the estimated first and second angle coordinates for each pixel to one or more color variables;

assigning the pixels color values according to their one or more color variables; and generating a display image from the pixel color values.

2. The method of claim 1, wherein generating a table of color values includes:

associating a color value with each of a sample of normal directions;

referencing each calculated color value through the one or more color variables related to the associated normal direction.

3. The method of claim 2, wherein associating a color value comprises:

calculating the color value for an orientation specified by the color variables using a selected illumination model.

4. The method of claim 3, wherein referencing each calculated color value comprises:

mapping the first and second angle coordinates to color variables having values between 0 and 1; and storing the calculated color value in a table indexed by the mapped color variables.

5. The method of claim 1, wherein estimating first and second angle coordinates comprises:

determining angle coordinates for normal vector orientations at vertices of the polygon;

interpolating first and second angle coordinates for the pixel from the determined angle coordinates.

6. A method for assigning color values to image pixels comprising:

in the geometry stage of a graphics pipeline, precalculating color values based on orientation-dependent color variables, for a sample of normal vector orientations, each color value being associated with scaled first and second angle coordinates that specify a normal vector orientation; and in a rendering stage of the graphics pipeline, estimating the scaled first and second angle coordinates for the pixels of the image;

retrieving color values for the pixels according to their scaled estimated angle coordinates; and generating a display image using the retrieved color values.

7. The method of claim 6, wherein the image pixels are grouped into polygons and each vertex of a polygon is assigned first and second angle coordinates.

8. The method of claim 7, wherein estimating first and second scaled angle coordinates comprises:

interpolating angle coordinates for the pixels of the polygon from vertex angle coordinates of the polygon; and scaling the interpolated angle coordinates.

9. The method of claim 8, wherein precalculating color values comprises:

parameterizing a sample of normal vector orientations using scaled first and second angle coordinates;

calculating a color value for each normal vector orientation using a selected illumination model; and associating each color value with the scaled first and second angle coordinates that parameterize the normal vector orientation used to calculate it.

10. A graphics system comprising:

a geometry engine to associate vector orientation data with vertices of one or more polygons representing an object in an image;

a color map to store color values for a sample of vector orientations, each color value being referenced by one or more orientation dependent color variables; and a rendering engine to convert vector orientation data for a polygon to first and second angle coordinates for each pixel of the polygon, to scale the first and second angle coordinates to one or more color variables for each pixel of the polygon, and to assign a color value to each pixel according to its one or more color variables.

11. The graphics system of claim 10, wherein the orientation-dependent color variables are linearly related to angle coordinates that specify the sampled vector orientations.

12. The graphics system of claim 10, wherein color values are associated with orientation-dependent color variables through an illumination model.

13. A machine readable medium on which are stored instructions that are executable by a system to implement a method for assigning a color value to an image pixel, the method comprising:

precalculating color values based on orientation-dependent color variables, for a sample of normal vector orientations, each color value being associated with first and second scaled angle coordinates representing a corresponding normal vector orientation;

estimating first and second scaled angle coordinates for the pixel; and retrieving a color value for the pixel according to the estimated scaled first and second angle variables.

14. The machine readable medium of claim 13, wherein the stored instructions also implement determining angle coordinates for vertices of a polygon that is used to represent the image.

15. The machine readable storage medium of claim 13, wherein the image is represented by plural polygons, and estimating comprises:

interpolating angle coordinates for the pixel from angle coordinates for vertices of a polygon that includes the pixel; and converting the intepolated angle coordinates to scaled angle coordinates.

16. The method of claim 1, wherein the table of color values is determined for an illumination geometry in which a reference vector orientation is parallel to a camera vector orientation.

17. The method of claim 1, wherein the first and second angle coordinates represent relative directions of a light vector and a normal vector for a pixel and converting the first and second angle coordinates comprises mapping the first and second angle coordinates to a single color variable for the light source at the pixel.

18. The method of claim 17, wherein the table comprises a table for each of plural light sources.

19. The method of claim 10, wherein the color map is determined for an illumination geometry in which a reference vector orientation is parallel to a camera vector orientation.

20. The method of claim 13, wherein generating color values for a sample of normal vector orientations comprises generating color values for a sample of normal vector orientations in which a reference normal vector is parallel to a camera normal vector.

21. The graphics system of claim 10, wherein the color map is determined for a reference direction which is parallel to the viewing direction.

22. The graphics system of claim 21, wherein the first and second angle coordinates represent relative orientations of light and normal vectors at each pixel.

23. The graphics system of claim 22, wherein the color map includes multiple color maps, each of which represents a different light source, and wherein first and second angle coordinates are determined for each of the different light sources.

* * * * *